US008287174B2

(12) United States Patent
Frese et al.

(10) Patent No.: US 8,287,174 B2
(45) Date of Patent: *Oct. 16, 2012

(54) CONTINUOUS PROCESS FOR THE PRODUCTION OF BASE COMPOSITIONS FOR IMPROVED-STABILITY SILICONE COMPOSITIONS

(75) Inventors: Thomas Frese, Burghausen (DE); Thomas Hierstetter, Burghausen (DE); Johann Schuster, Emmerting (DE); Christof Woerner, Burghausen (DE)

(73) Assignee: Wacker Chemie AG, Munich (DE)

( * ) Notice: Subject to any disclaimer, the term of this patent is extended or adjusted under 35 U.S.C. 154(b) by 220 days.

This patent is subject to a terminal disclaimer.

(21) Appl. No.: 12/640,291

(22) Filed: Dec. 17, 2009

(65) Prior Publication Data

US 2010/0160543 A1  Jun. 24, 2010

(30) Foreign Application Priority Data

Dec. 19, 2008 (DE) .......................... 10 2008 055 035

(51) Int. Cl.
 *C08K 3/20* (2006.01)
(52) U.S. Cl. .............................. 366/78; 366/91; 524/492
(58) Field of Classification Search .................... 366/78, 366/91; 524/492
 See application file for complete search history.

(56) References Cited

U.S. PATENT DOCUMENTS

| | | | |
|---|---|---|---|
| 5,057,151 A | 10/1991 | Schuster et al. | |
| 5,531,923 A | 7/1996 | Le Blanc et al. | |
| 5,854,343 A | 12/1998 | Schuster et al. | |
| 6,749,786 B2 | 6/2004 | Boudreau et al. | |
| 2004/0192809 A1* | 9/2004 | Heisler et al. | 523/348 |
| 2006/0140048 A1 | 6/2006 | Ulzheimer | |

FOREIGN PATENT DOCUMENTS

| | | |
|---|---|---|
| EP | 0462032 A1 | 12/1991 |
| EP | 0776751 A1 | 6/1997 |
| EP | 0807509 A1 | 11/1997 |
| EP | 1203650 B1 | 8/2006 |
| GB | 2384488 A | 7/2003 |

* cited by examiner

*Primary Examiner* — Margaret Moore
(74) *Attorney, Agent, or Firm* — Brooks Kushman P.C.

(57) ABSTRACT

Base compositions for addition-crosslinking silicone compositions are continuously produced by, in a first stage, homogeneously mixing and kneading organopolysiloxanes and flowable prehydrophobized oxidic reinforcing fillers in a continuous kneading machine with kneading chambers arranged alongside one another. In a second, downstream, stage of the process, the compositions produced in the first stage are subjected to aftertreatment in a mixing apparatus in which the compositions have been subjected to a mixing procedure with introduction of shear force.

13 Claims, 4 Drawing Sheets

CONTINUOUS PROCESS FOR THE PRODUCTION OF BASE COMPOSITIONS FOR IMPROVED-STABILITY SILICONE COMPOSITIONS

CROSS-REFERENCE TO RELATED APPLICATION

This application claims priority to German application DE 10 2008 055 035.3 filed Dec. 19, 2008, which is herein incorporated by reference.

BACKGROUND OF THE INVENTION

1. Field of the Invention

The present invention relates to a continuous process for the production of base compositions for addition-crosslinking silicone compositions which have improved stability in relation to viscosity increase, SiH degradation, change of reactivity, and also additive degradation after storage.

2. Background Art

Those skilled in the art of silicone elastomers are aware that silicone compositions comprising filler, for example liquid silicone rubbers (LSR) are composed mainly of base compositions. For the production of liquid silicone rubbers, base compositions are mixed homogeneously with a vulcanizing agent, and also with other typical constituents of addition-crosslinking silicone compositions, which serve to establish certain final properties of the silicone elastomers obtained after the vulcanization process.

One prior-art method for the production of base compositions is based on use of prehydrophobized fillers, homogeneously mixed and kneaded together with appropriate organopolysiloxanes. Another method for producing base compositions uses hydrophilic fillers, which are hydrophobized in-situ during what is known as the compounding procedure, with use of suitable treatment agents. In both instances, the incorporation procedure usually takes place in a planetary-geared dissolver or a kneader, an example being a sigma kneader or an open divided-trough kneader, these being unsuitable in principle for a continuous production process. The batch processes described, and in particular here the in-situ process, feature a disadvantageous space-time yield, high energy consumption, and the need to use inert gas because of the risk of formation of explosive mixtures, and they moreover have very high capital investment costs and labor costs. Kneaders operating batchwise can produce silicone compositions with high storage stability from base compositions comprised of organopolysiloxanes and of prehydrophobized oxidic reinforcing fillers, and the silicone elastomers produced using these base compositions feature a very balanced mechanical property profile.

There are numerous known prior-art technologies for producing silicone compositions by way of continuous process steps. The continuous steps in the process can be related either to the continuous production of base compositions or else to the continuous production of finished silicone compositions, the latter being composed in most cases of one or more components.

Silicone compositions which are composed of base compositions produced continuously, and which use prehydrophobized fillers, generally have lower stability when compared with silicone compositions comprising base compositions produced batchwise.

Comparatively low residence time of the organopolysiloxane and of the filler in continuous processes for the production of base compositions often leads to incomplete breakdown of agglomerates of the filler, and the result of this can be inhomogeneity in the silicone elastomer, or poor transparency, as previously stated in EP 1 203 650 B1.

The reduced stability of silicone compositions produced by prior art methods from continuously produced base compositions can become apparent, for example, as an increase in the viscosity of the silicone compositions after storage, and this occurs particularly at elevated temperatures, for example during transport of the silicone compositions.

A comparatively low residence time of the organopolysiloxanes and filler in continuous processes for the production of base compositions can also lead to inadequate deactivation of the surface of the filler, a possible result of this being undesired reactions in the finished silicone composition. By way of example, if organohydropolysiloxanes are used as crosslinking agents in the finished silicone compositions, an increased level of degradation of SiH groups can be observed, with evolution of hydrogen. This is attended by a considerable risk of explosion when oxygen is present. An associated change in the architecture of the network also creates the risk of altering the property profile of the silicone elastomers obtained after the vulcanization process. In self-adhesive silicone compositions, another possible result of an inadequately deactivated surface of the filler is undesired reactions of reactive groups at the surface of the filler with additives such as adhesion promoters, inevitably leading to impairment of adhesion properties.

EP 0 462 032 A1 describes a continuous in-situ process for the production of base compositions which are suitable for the production of silicone compositions crosslinkable by way of a polyaddition reaction. The compounding process takes place in a twin-screw extruder via continuous and simultaneous feed of an organopolysiloxane bearing vinyl groups, of a filler, and also of a liquid polysilazane, and water.

EP 0 776 751 A1 describes a continuous in-situ process for the production of base compositions by producing the base composition in a machine using a biaxial system of continuous extrusion and mixing. The machine using a biaxial system of continuous extrusion and mixing has a double-lumen inlet tube by way of which the hydrophobizing agent, composed of hydrolyzable organosilicon compound and water, and the filler are fed by way of the outer lumen, and the organopolysiloxane is added by way of the inner lumen.

U.S. Pat. No. 6,749,786 B2 describes a continuous in-situ process for the production of base compositions for liquid silicone rubbers (LSR) with low volatiles content, by using an extruder with an L/D ratio (length to diameter) which is at least greater than 70. The devolatilization process takes place at a plurality of apertures positioned shortly prior to the extruder outlet.

All of the in-situ processes described have the disadvantage of high emissions (problem of exhaust gas) which occur on all kneading machines and are difficult to control. Another factor with continuous in-situ processes is that there are only limited opportunities for targeted control of the hydrophobization process, and a relatively high level of product quality variation can therefore be observed. Another disadvantage of in-situ processes derives from the ever-present risk that explosive mixtures will be formed.

EP 0 807 509 A1 discloses the continuous production of storage-stable addition-crosslinking liquid silicone rubbers, using a specific cascade of kneading machinery. The devolatilization of the base compositions produced by means of the kneading machine takes place by way of a simple devolatilizing container, but this does not encompass any aftertreatment of the base composition by way of a specifically designed aftertreatment apparatus with introduction of shear force and with high average residence time. Although the silicone compositions produced from the base compositions feature improved stability with respect to viscosity increase on storage, this is still not entirely satisfactory since it is still possible to observe an undesired viscosity increase, leading to reduction in the shelf life of the finished silicone compositions. When liquid silicone rubbers are processed by the injection-molding process, increased viscosity can lead to problems attributed to the change in rheological properties. By way of example, another problem known to those skilled in the art can also arise at metering apparatuses if inadequate storage stability has led to excessive viscosity. There is moreover also a considerable need for improvement in the stability of the silicone compositions produced from the base compositions, with respect to SiH degradation and degradation of additives, for example adhesion promoters or organically based stabilizers. A further disadvantage of the process described in EP 0 807 509 A1 is that the maximum volume flow rates that can be achieved by that continuous process are 300 kg/h. Marked impairment of the stability of the base compositions is observed at any higher throughput.

In summary, it can be stated that none of the continuous processes known hitherto for the production of base compositions for silicone compositions satisfactorily complies with the requirements placed upon these silicone compositions, in particular liquid silicone rubbers processed by injection molding.

SUMMARY OF THE INVENTION

It is therefore an object of the present invention to improve upon the prior art and to provide a continuous process for producing base compositions which are composed of prehydrophobized oxidic reinforcing filler and of organopolysiloxanes and which are used to produce finished addition-crosslinking liquid silicone rubber compositions complying with the following requirements:
  high stability with respect to viscosity increase on storage, in particular at elevated temperatures,
  high stability with respect to loss of reactivity, i.e. zero or very little change in crosslinking characteristic on storage,
  high stability with respect to undesired reactions with additives, such as adhesion promoters or stabilizers,
  good demoldability in particular from metallic vulcanization molds, immediately after the vulcanization process,
  high level of service properties, such as transparency, and of the mechanical property profile, particular examples being tear-propagation resistance, ultimate tensile strength, elongation at break, and compression set.

A further object was to provide a process permitting volume flow rates of more than 300 kg/h. These and other objects are achieved through the use of a multiple-chambered kneading machine to which organopolysiloxane and prehydrophobicized filler are added and mixed, and then supplying this admixture to a second downstream stage in which the admixture is subject to shear by rotating mixing/kneading units and devolatized with constant renewal of the surface.

DETAILED DESCRIPTION OF THE PREFERRED EMBODIMENT(S)

Figure 1:
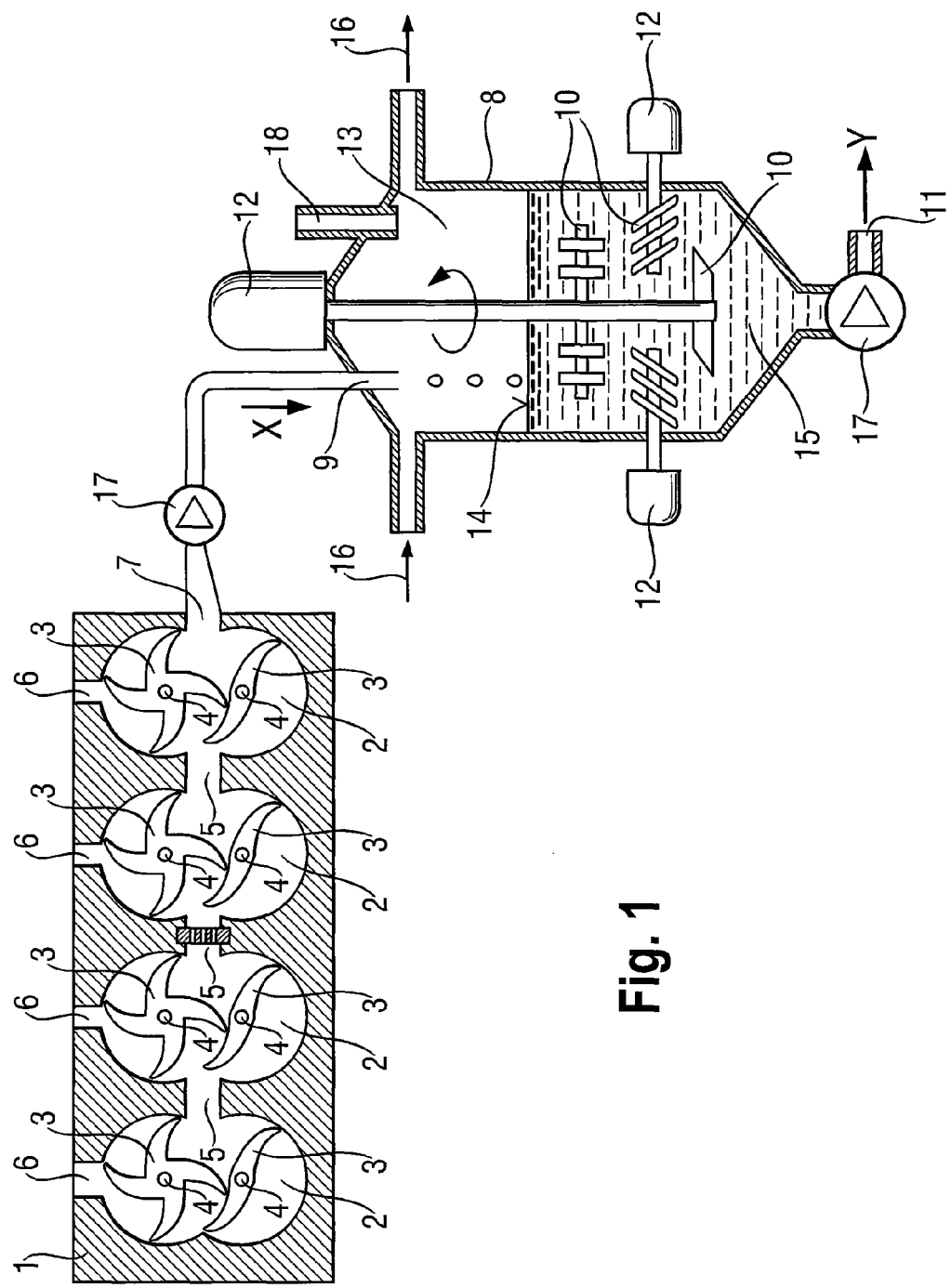
FIG. 1 illustrates one embodiment of the invention.
Figure 2:
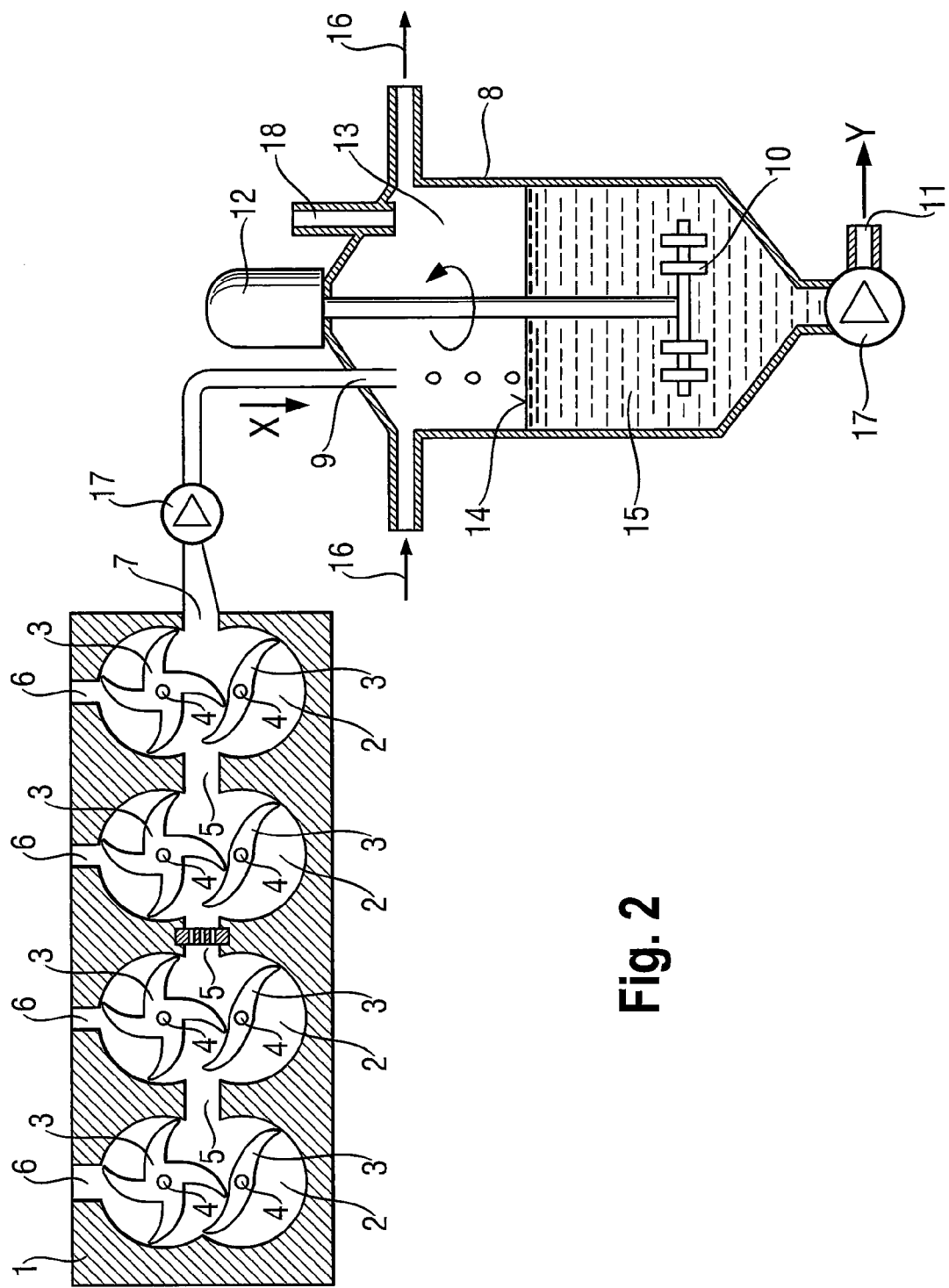
FIG. 2 illustrates a further embodiment of the invention.
Figure 3:
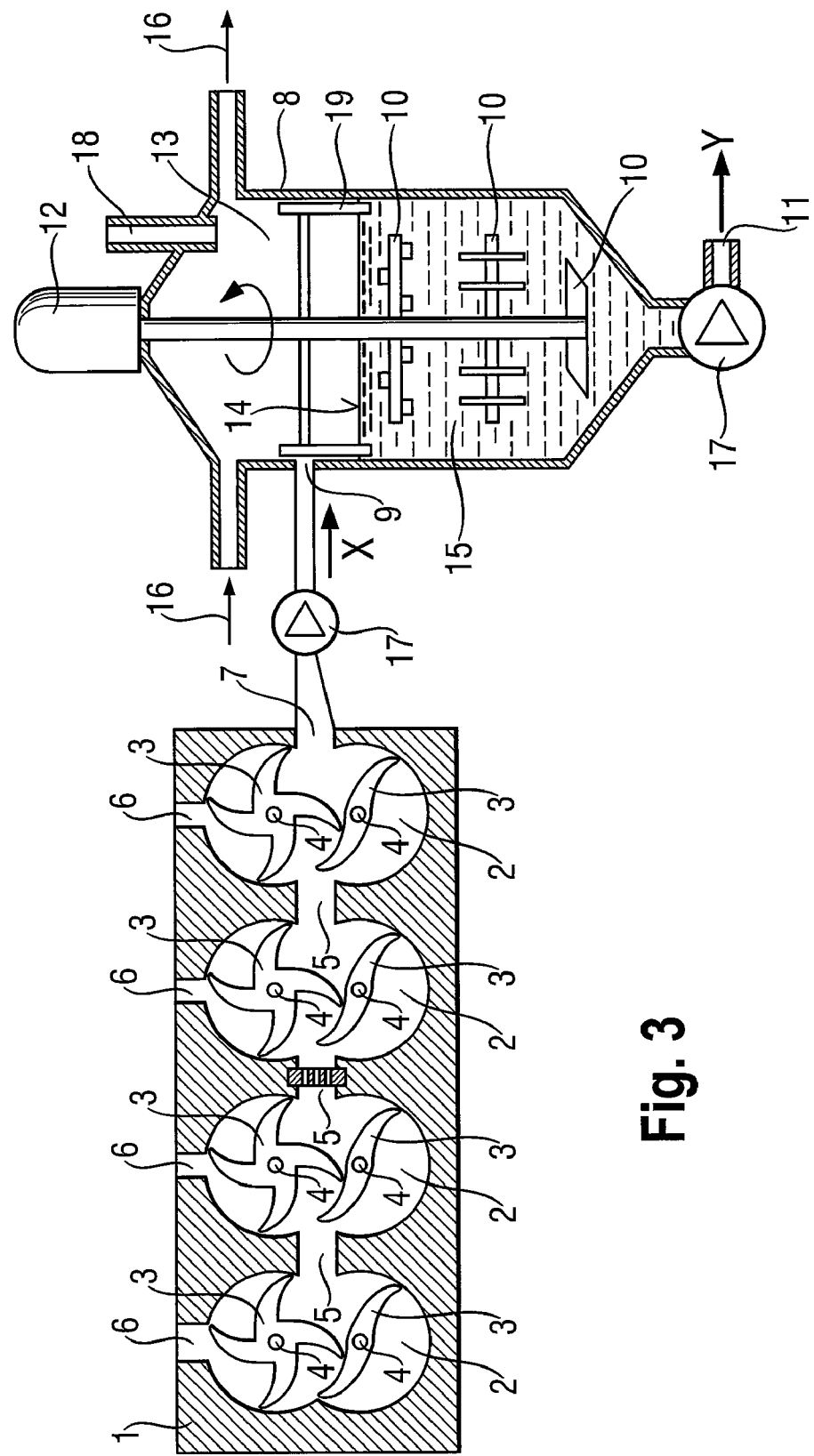
FIG. 3 illustrates a further embodiment of the invention.
Figure 4:
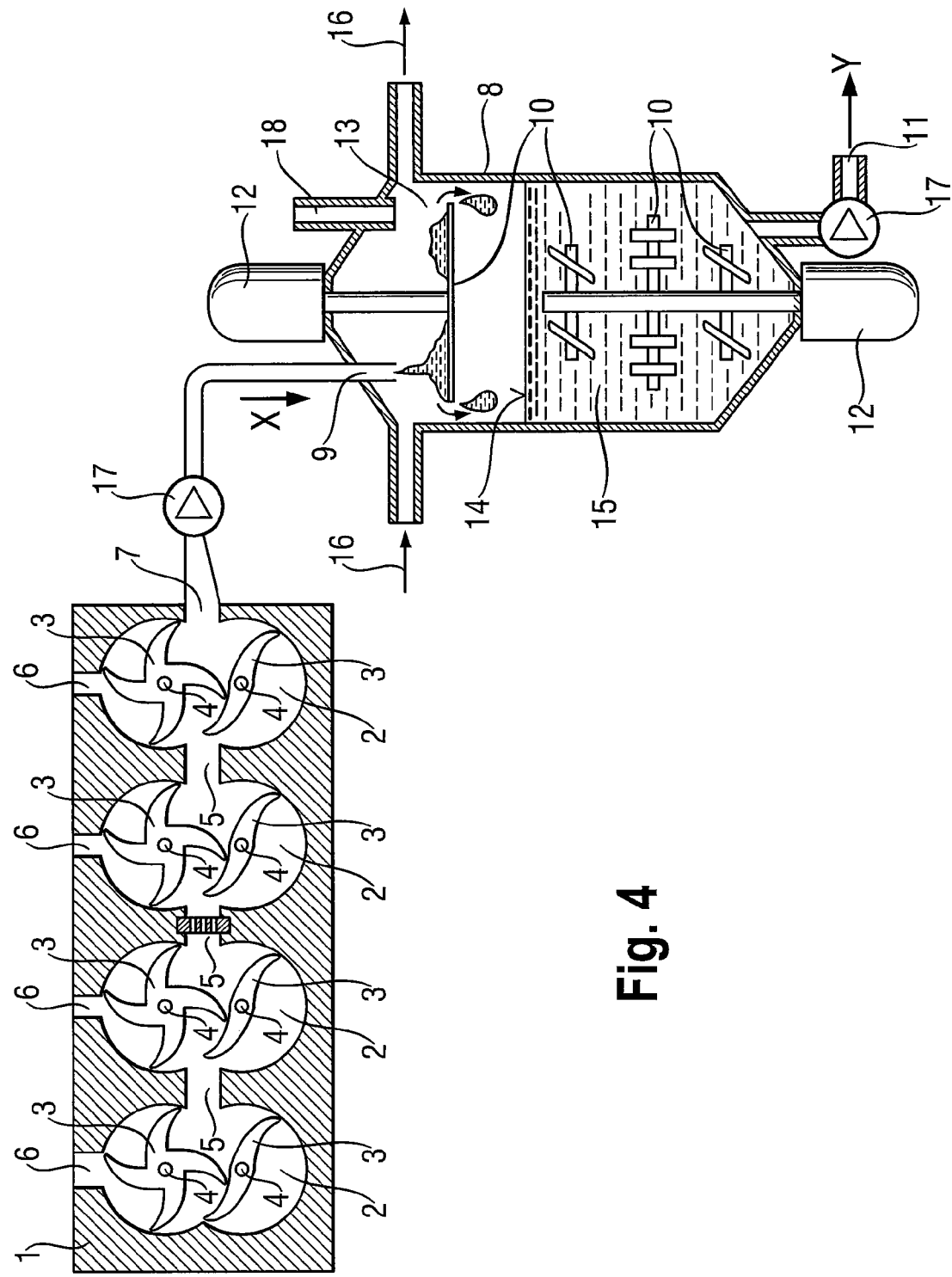
FIG. 4 illustrates a further embodiment of the invention.

The present invention therefore provides a process for the production of base compositions with viscosity from 500,000 to 12,000,000 mPa·s, measured at 25° C. and at a shear rate of $1\ s^{-1}$, which comprises, in a first stage of the process, homogeneously mixing and kneading the following with one another
  at least one diorganopolysiloxane (A) of the general formula (I)

$$R^1_a R^2_b SiO_{(4-a-b)/2} \qquad (I)$$

where
$R^1$ is a hydroxy moiety or a monovalent, optionally halogen-substituted hydrocarbon moiety which has from 1 to 20 carbon atoms and which optionally contains O atoms, N atoms, S atoms, or P atoms, and which is free from aliphatically unsaturated groups,
$R^2$ is a monovalent, aliphatically unsaturated, optionally halogen-substituted hydrocarbon moiety which has from 2 to 10 carbon atoms and which optionally contains O atoms, N atoms, S atoms, or P atoms,
b is from 0.0001 to 2,
  with the proviso that $1.5<(a+b)\leqq 3.0$ and that there is an average of at least two aliphatically unsaturated moieties $R^2$ per molecule, and that the viscosity of the diorganopolysiloxanes (A), determined at 25° C., is from 1 to 40,000,000 mPa·s,
and
  at least one prehydrophobized oxidic reinforcing filler (B) having at least 0.5% by weight carbon content introduced via the hydrophobizing process,
in a kneading cascade (1) with at least two kneading chambers (2) arranged alongside one another in series, each of these comprising, parallel to the axis, two kneading units (3) driven so as to corotate or counterrotate, and are connected to other kneading chamber(s) via passage apertures (5) running perpendicularly with respect to the axes (4) of the kneading units (3), where at least the first kneading chamber has a supply aperture (6) and the last kneading chamber has a discharge aperture (7), and subjecting the resultant composition, in a second downstream stage of the process, to aftertreatment in a mixing apparatus (8), which has a supply aperture (9), by way of which the composition produced by way of the first stage of the process is introduced at a defined volume flow rate X to the mixing apparatus, subjected to shear force and devolatilized, with constant renewal of the surface (14), with use of rotating mixing/kneading units (10), and also optionally of scrapers (19), and is discharged from the second stage of the process by way of a discharge aperture (11) at the volume flow rate Y.

Examples of the moieties $R^1$ of at least one diorganopolysiloxane (A) are alkyl radicals such as the methyl, ethyl, propyl, isopropyl, tert-butyl, n-pentyl, isopentyl, neopentyl, tert-pentyl, n-ocytl, 2-ethylhexyl, 2,2,4-trimethylpentyl, n-nonyl, and octadecyl radicals; cycloalkyl radicals such as the cyclopentyl, cyclohexyl, cycloheptyl, norbornyl, adamantylethyl, and bornyl radicals; aryl or alkaryl radicals such as the phenyl, ethylphenyl, tolyl, xylyl, mesityl, and naphthyl radicals; aralkyl radicals such as the benzyl, 2-phenylpropyl, and phenylethyl radicals, and also halogenated derivatives of the abovementioned radicals and derivatives of the abovementioned radicals functionalized by organic groups, examples being the 3,3,3-trifluoropropyl, 3-iodopropyl, 3-isocyanatopropyl, aminopropyl, methacryloxymethyl, or cyanoethyl radicals.

Preferred radicals $R^1$ contain from 1 to 10 carbon atoms and also, if appropriate, halogen substituents. Particularly preferred moieties $R^1$ are the methyl, phenyl, and 3,3,3-trifluoropropyl radicals, in particular the methyl radical.

The radicals $R^2$ are accessible to a hydrosilylation reaction. Examples of these are alkenyl, and alkynyl radicals such as vinyl, allyl, isopropenyl, 3-butenyl, 2,4-pentadienyl, butadienyl, 5-hexenyl, undecenyl, ethynyl, propynyl, and hexynyl radicals; cycloalkenyl radicals such as the cyclopentenyl, cyclohexenyl, 3-cyclohexenylethyl, 5-bicycloheptenyl, norbornenyl, 4-cyclooctenyl, and cyclooctadienyl radicals; alkenylaryl radicals such as styryl and styrylethyl radicals, and also halogenated derivatives of the abovementioned radicals and derivatives of the abovementioned radicals containing heteroatoms, examples being the 2-bromovinyl, 3-bromo-1-propynyl, 1-chloro-2-methylallyl, 2-(chloromethyl)allyl, styryloxy, allyloxypropyl, 1-methoxyvinyl, cyclopentenyloxy, 3-cyclohexenyloxy, acryloyl, acryloyloxy, methacryloyl, and methacryloyloxy radicals. Preferred radicals $R^2$ are the vinyl, allyl, and 5-hexenyl radicals, in particular the vinyl radical.

The viscosity of the diorganopolysiloxane (A) of the general formula (I), determined at 25° C., is preferably from 1 to 40,000,000 mPa·s, more preferably from 1 to 8,000,000 mPa·s, and in particular from 1 to 800,000 mPa·s.

The diorganopolysiloxane (A) of the general formula (I) can be a diorganopolysiloxane having a monomodal or multimodal molecular-weight distribution, or a mixture composed of various diorganopolysiloxanes having monomodal or multimodal molecular-weight distributions.

The diorganopolysiloxane (A) of the general formula (I) preferably has an average of from 1 to 15, more preferably an average of from 1 to 10, and in particular an average of from 1 to 4, monovalent, aliphatically unsaturated, optionally halogen-substituted hydrocarbon moieties having from 2 to 10 carbon atoms and optionally containing O atoms, N atoms, S atoms, or P atoms.

Examples of diorganopolysiloxane (A) of the general formula (I) are linear, branched, and cyclic diorganopolysiloxanes preferably composed of units of the formulae $(CH_3)_3SiO_{1/2}$, $(H_2C=CH)(CH_3)_2SiO_{1/2}$, $(CH_3)_2SiO_{2/2}$, $(H_2C=CH)(CH_3)SiO_{2/2}$, or of a mixture thereof.

Preferred embodiments of the diorganopolysiloxanes (A) are copolymers containing $(H_2C=CH)(CH_3)SiO_{2/2}$ and $(CH_3)_2SiO_{2/2}$ units, having $(CH_3)_3SiO_{1/2}$ end groups, copolymers containing $(CH_3)_2SiO_{2/2}$ units, having $(H_2C=CH)(CH_3)_2SiO_{1/2}$ end groups, copolymers containing $(H_2C=CH)(CH_3)SiO_{2/2}$ and $(CH_3)_2SiO_{2/2}$ units, having $(H_2C=CH)(CH_3)_2SiO_{1/2}$ end groups, copolymers containing $(CH_3)_2SiO_{2/2}$ units, having $(CH_3)_3SiO_{1/2}$ end groups,
copolymers containing $(Ph)_2SiO_{2/2}$ and $(H_2C=CH)(CH_3)SiO_{2/2}$ units, having $(CH_3)_3SiO_{1/2}$ end groups, copolymers containing $(Ph)_2SiO_{2/2}$, $(CH_3)_2SiO_{2/2}$ and $(H_2C=CH)(CH_3)SiO_{2/2}$ units, having $(CH_3)_3SiO_{1/2}$ end groups, copolymers containing $(Ph)_2SiO_{2/2}$ and $(H_2C=CH)(CH_3)SiO_{2/2}$ units, having $(H_2C=CH)(CH_3)_2SiO_{1/2}$ end groups, copolymers containing $(Ph)_2SiO_{2/2}$, $(CH_3)_2SiO_{2/2}$ and $(H_2C=CH)(CH_3)SiO_{2/2}$ units, having $(H_2C=CH)(CH_3)_2SiO_{1/2}$ end groups,
copolymers containing $(Ph)(CH_3)SiO_{2/2}$, $(CH_3)_2SiO_{2/2}$ and $(H_2C=CH)(CH_3)SiO_{2/2}$ units, having $(CH_3)_3SiO_{1/2}$ end groups, copolymers containing $(Ph)(CH_3)SiO_{2/2}$, $(CH_3)_2SiO_{2/2}$ and $(H_2C=CH)(CH_3)SiO_{2/2}$ units, having $(H_2C=CH)(CH_3)_2SiO_{1/2}$ end groups, and copolymers containing $(Ph)(CH_3)SiO_{2/2}$ and $(H_2C=CH)(CH_3)SiO_{2/2}$ units, having $(CH_3)_3SiO_{1/2}$ end groups.

Particularly preferred embodiments of the diorganopolysiloxanes (A) of the general formula (I) are copolymers containing $(H_2C=CH)(CH_3)SiO_{2/2}$ and $(CH_3)_2SiO_{2/2}$ units, having $(CH_3)_3SiO_{1/2}$ end groups, copolymers containing $(CH_3)_2SiO_{2/2}$ units, having $(H_2C=CH)(CH_3)_2SiO_{1/2}$ end groups, copolymers containing $(H_2C=CH)(CH_3)SiO_{2/2}$ and $(CH_3)_2SiO_{2/2}$ units, having $(H_2C=CH)(CH_3)_2SiO_{1/2}$ end groups, and copolymers containing $(CH_3)_2SiO_{2/2}$ units, having $(CH_3)_3SiO_{1/2}$ end groups.

In view of the synthetic routes familiar in the prior art, and in the presence of suitable catalysts and reactants, the diorganopolysiloxane (A) of the general formula (I) can have low content of Si-bonded OH groups, typically smaller than 100 ppm by weight.

In one particularly preferred embodiment, the diorganopolysiloxane (A) of the general formula (I) is free from aromatic groups.

The reinforcing fillers (B) are prehydrophobized fillers. The prehydrophobized reinforcing fillers (B) are preferably in each case oxidic prehydrophobized pulverulent fillers, for example fumed silica, precipitated silica and silicon-aluminum mixed oxides, or fibrous fillers, such as asbestos, or a mixture thereof. The carbon content obtained by the fillers (B) by virtue of the hydrophobization process is preferably at least 0.5% by weight and preferably at most 6% by weight. When the carbon content of the fillers is determined, the materials are dried for at least 2 hours at least 200° C. to ensure that the carbon content measured relates to the hydrophobized layer of the fillers (B).

Particularly preferred reinforcing fillers (B) are fumed silica and precipitated silica. The specific surface area of these actively reinforcing fillers should be at least 50 $m^2/g$, or preferably in the range from 100 to 400 $m^2/g$, when determined by the BET method. Actively reinforcing fillers of this type are materials very well known to those skilled in the art of silicone rubber.

The fillers (B) have been hydrophobized by treatment with, for example, organosilanes, -silazanes, or -siloxanes, or by etherification of hydroxy groups to give alkoxy groups. U.S. Pat. No. 5,057,151 describes one preferred process for hydrophobization.

The content of prehydrophobized, oxidic, reinforcing filler (B) in the base composition produced by the process of the invention is preferably in the range from 0 to 70% by weight, more preferably in the range from 0 to 50% by weight, and most preferably in the range from 20 to 40% by weight.

A proportion which is preferably up to 70% by weight, with greater preference from 0.0001 to 40% by weight, of further additives (H) can optionally be present as constituents in the base compositions produced by the process of the invention. These additives (H) can be added in the first stage of the process, in the second stage of the process, or prior to or after the process of the invention. The additives can, by way of example, be stabilizers, pigments, or other additives which facilitate processing or the wetting of the filler used with the organopolysiloxane, or which serve to adjust particular final properties of the silicone elastomers obtained after the vulcanization process. The additives can, by way of example, also be inert fillers such as quartz, talc, resinous polyorganosiloxanes, dispersing agents, solvents, adhesion promoters, pigments, dyes, plasticizers, organic polymers, heat stabilizers, etc. Among these are additives such as activated charcoal, powdered quartz, diatomaceous earth, clays, chalk, lithopones, carbon blacks, graphite, metal oxides, metal carbonates, metal sulfates, metal salts of carboxylic acids, metal dusts, fibers, such as glass fibers, synthetic fibers, plastics powders, dyes, pigments, etc.

The base compositions produced by the process of the invention are preferably used for producing liquid silicone rubbers.

To permit achievement of adequately high mechanical strength of the crosslinked silicone rubber produced from the base compositions produced in the invention, the process of the invention must homogeneously mix and knead the following with one another: the diorganopolysiloxane (A) and the prehydrophobized oxidic reinforcing filler (B) having at least 0.5% by weight carbon content obtained via the hydrophobization process.

Surprisingly, it has been found that use of base compositions derived from the process of the invention, via the two-stage process described, the first stage of which corresponds to the previously known process of EP 0 807 509 A1 and the second stage of which corresponds to a continuous aftertreatment of the composition obtained from the first stage of the process, by way of the mixing apparatus (8) described, can give silicone compositions which have the following advantages over silicone compositions produced exclusively by the process described in EP 0 807 509 A1:

improved stability with respect to viscosity increase on storage, in particular at elevated temperatures,
improved stability with respect to loss of reactivity, i.e. very little change in crosslinking behavior on storage,
improved stability with respect to undesired reactions with additives, such as adhesion promoters or stabilizers.

The silicone elastomers produced from silicone compositions via crosslinking and comprising the base compositions produced in the invention moreover have good demoldability, in particular from metallic vulcanization molds immediately after the vulcanization process, and a high level of service properties such as transparency, and mechanical property profile, for example in particular tear-propagation resistance, ultimate tensile strength, elongation at break, and compression set.

Another advantage of the process of the invention is that volume flow rates of more than 300 kg/h are possible. This provides considerable economic advantages over the prior art.

In one preferred embodiment, the first stage of the process has additionally been equipped with at least one devolatilization apparatus where a vacuum is applied, for example a devolatilization dome. In one particularly preferred embodiment, the vacuum is applied in the viscose phase.

In the second stage of the process of the invention, the composition produced in the first stage of the process is subjected to aftertreatment in a mixing apparatus (8), which has a supply aperture (9), by way of which the composition produced by way of the first stage of the process is introduced at a defined volume flow rate X to the mixing apparatus (8), and is subjected to shear force and devolatilized, with constant renewal of the surface (14), with use of rotating mixing/kneading units (10), and is discharged from the second stage of the process by way of a discharge aperture (11) at the volume flow rate Y, where the viscosity of the resultant base composition is from 500,000 to 12,000,000 mPa·s at a temperature of 25° C. and at a shear rate of $1\ s^{-1}$.

In one preferred embodiment of the process of the invention, the average residence time of the base composition is longer in the second stage of the process than in the first stage of the process.

The residence time of the base composition produced in the second stage of the process is defined as the quotient obtained by dividing the system volume occupied by the base composition by the volume flow rate Y discharged. The residence time here is in the range from 0.1 to 15 h, preferably from 0.5 to 10 h, and most preferably from 1 to 10 h.

The mixing/kneading unit (10) used in the second stage of the process can be either elements with purely mixing action or else elements with shearing action. In one particularly preferred embodiment, the mixing apparatus (8) comprises, as mixing/kneading units (10), not only elements with mixing action but also elements with shearing action. As a function of the design of the system, i.e. depending on adjustment of the volume that the base composition occupies in the mixing apparatus (8) of the second stage of the process during continuous operation, and on the volume flow rates X and Y, the continuously operating mixing apparatus (8) can be used to set various residence times.

In one preferred embodiment, the mixing apparatus (8) of the second stage of the process is operated in such a way that there is an adequately large gas space (13) adjacent to the base composition within the mixing apparatus. In one particularly preferred embodiment, the mixing apparatus (8) of the second stage of the process is operated in such a way that, based on the total volume of the mixing apparatus (8), the amount of the base composition present is from 20 to 90%, in particular from 30 to 80% of the total volume.

In one preferred embodiment of the process of the invention, the second stage of the process subjects the compositions produced in the first stage of the process to a mixing procedure in which the shear force introduced is smaller than in the first stage of the process.

In another preferred embodiment of the process of the invention, the second stage of the process subjects the compositions produced in the first stage of the process to vacuum treatment at an elevated temperature. The temperature is preferably in the range from 80 to 250° C., more preferably from 120 to 250° C., and most preferably from 140 to 230° C. The pressure is preferably in the range from 1 to 900 mbar, more preferably from 1 to 300 mbar, and most preferably from 1 to 100 mbar.

In another preferred embodiment of the process of the invention, the surface area to volume ratio is greater in the second stage of the process than in the first stage of the process.

In the present invention, the surface area to volume ratio is the ratio of that surface area (14) of the base composition which is adjacent to a vacuum (13) or to a gas space (13), to the volume (15) occupied by the base composition in the mixing apparatus (8). The surface area to volume ratio should preferably be in the range from 0.1 to 10, more preferably from 0.25 to 10, and most preferably from 0.5 to 8.

In another preferred embodiment of the process of the invention, mixing/kneading units (10) used in the second stage of the process are selected from planetary-gear or double-planetary-gear mixing units, crossblade mixing units, helical mixing units, dissolver disk units, propeller mixing units, and scrapers. It is also possible to use combinations of the units (10) described. It is most preferable in the second stage of the process to use mixing/kneading units (10) selected from planetary-gear or double-planetary-gear mixing units, crossblade mixing units, dissolver disk units, and scrapers, and combinations thereof.

In another preferred embodiment of the process of the invention, a plurality of mixing/kneading units (10) used in the second stage of the process are driven by way of drive apparatuses (12) operating independently of one another. The mixing/kneading units (10) can be driven so as to corotate or counterrotate.

In one preferred embodiment, the second stage of the process is equipped with a heating apparatus which can heat the composition to a temperature of up to 250° C. This can be realized, for example, by way of at least one heating jacket mounted on the outer wall of the mixing apparatus. Another possibility consists of at least one immersion heater securely mounted in the interior of the mixing apparatus and permitting introduction of an appropriate amount of heat into the base composition.

In one embodiment of the process of the invention, the volume flow rate X in the mixing apparatus (8) of the second stage of the process is adjusted so that the ratio to the volume flow rate Y is in the range from 0.5 to 1.5.

In another preferred embodiment of the invention, the devolatilization of the composition in the mixing apparatus (8) of the second stage of the process takes place by means of a continuous or non-continuous stream of gas (16) in the vacuum (13), where the gas introduced into the mixing apparatus is known as an entrainer gas and is used to improve removal of volatile constituents. In one particularly preferred embodiment, inert gases are used as entrainer gas, in particular nitrogen.

In one preferred embodiment, there is a direct connection between the first stage of the process and the second stage of the process. This is preferably achieved in that the base composition produced in the first stage of the process has a direct connection by way of a pipe system to the second stage of the process, if appropriate with the aid of a conveyor apparatus (17), for example a pump. This provides fully continuous production of base compositions by the process of the invention.

In the invention, the second stage used in the process is controlled in continuous operation in such a way that there is always an adequate amount of composition in the mixing apparatus. This is primarily achieved by way of the adjustment of the volume flow rates X and Y. The amount of shear introduced, and also the intensity of mixing, can also be adjusted as desired by way of control of the rotation rate and the direction of rotation of the mixing/kneading units (10). In one preferred embodiment, the rotation rates of the mixing/kneading units (10), with the exception of dissolver disk units, are in the range from 0.1 to 150 $s^{-1}$, more preferably in the range from 1 to 100 $s^{-1}$. In another preferred embodiment, the rotation rate(s) of dissolver disk unit(s) is/are in the range from 50 to 1000 $s^{-1}$, more preferably in the range from 200 to 600 $s^{-1}$.

In one preferred embodiment of the second stage of the process, the design of the mixing/kneading units (10) is such that the base composition is conveyed to the discharge aperture (11). It can also be conveyed to the discharge aperture with the aid of a conveyor apparatus (17), for example with the aid of a pump.

Within the mixing apparatus (8) of the second stage of the process, it is preferable that, alongside the supply aperture (9) for the base composition from the first stage of the process, there are further supply apertures (18) present, which permit continuous introduction of, for example, processing aids, or further organopolysiloxanes, or additives.

FIGS. 1 to 4 show possible embodiments of the first and second stage of the process in the form of sectional drawings. Identical elements are indicated by identical numerals in the figures. In all of the FIGS. 1 to 4, the kneading cascade (1) has four kneading chambers (2) arranged alongside one another in series. These figures represent only some possible embodiments of the apparatus that can be used for the process of the invention, and do not restrict the process to these apparatuses.

It is preferable that the kneading cascade (1) of the first stage of the process has at least three, in particular at least five, kneading chambers (2). The supply apertures (6) can lead directly into kneading chambers (2) or can have been arranged between two kneading chambers (2).

In one preferred embodiment of the kneading cascade (1) of the first stage of the process, the last kneading chamber has pump vanes to improve product discharge. The feed of the starting materials and their incorporation by mixing, for example of the organopolysiloxanes (A), of the fillers (B), and, if appropriate, of further additions, into the base composition can take place in any desired sequence; it is also possible that the feed of, for example, the fillers (B) takes place in one or more kneading chambers (2) of the kneading cascade (1). The feed of the organopolysiloxanes (A) can take place either in the first kneading chamber (2) or else—at least in proportions—in one or more downstream kneading chambers (2), in order by way of example to reduce the viscosity of the composition. The required fillers (B) can be fed into all of the kneading chambers (2), but it is preferable that no filler (B) is fed into the last chamber (2). It is possible here to add the entire required amount of filler only in, for example, one, two, three, or four, of the first chambers (2), however, it is also possible to distribute portions of the filler over all of these.

The mixing apparatuses (8) which are part of the second stage of the process and which have been sketched as possible embodiments in FIGS. 1 to 4 are composed of a preferably metallic container, which has a supply aperture (9), by way of which the composition from the first stage of the process is introduced at a volume flow rate X. The mixing/kneading units (10) can also optionally be supplemented by scrapers (19). They are rotated with the aid of a drive apparatus (12), for example an electric motor, or by way of a hydraulic assembly, and can by way of example be controlled independently of one another by way of a torque regulator. The mixing apparatus (8) has a gas inlet and a gas outlet (16), and it is preferable that an entrainer gas is introduced here by way of the gas inlet and that a vacuum is preferably applied at the gas outlet. The base composition is discharged by way of the discharge aperture (11) of the second stage of the process.

EXAMPLES

The examples below illustrate the invention but have no restricting effect. Unless otherwise stated, all of the quantitative and percentage data in the examples are based on weight and all of the pressures are 0.10 MPa (abs.). The viscosities stated were determined at a temperature of 20° C., unless otherwise stated.

In all of the examples, a base composition was produced with the following constituents:
Organopolysiloxane (A)
Vinyldimethylsiloxy-terminated polydimethylsiloxane with viscosity about 20,000 mPa·s, measured at 25° C.
Prehydrophobized oxidic reinforcing filler (B)
Wacker® HDK SKS 300, fumed silica with specific surface area 300 $m^2$/g measured by the BET method, and with from 3.9 to 4.2% by weight carbon content.
Adhesion Promoter
3-Glycidoxypropyltrimethoxysilane with trademark GENIOSIL® GF 80 (CAS 2530-83-8) from Wacker Chemie AG.

Comparative Example C1

Continuous Production of a Base Composition for Addition-crosslinking Liquid Silicone Rubbers 150 kg/h of polydimethylsiloxane having vinyl end groups, with a viscosity of 20,000 mPa·s, and also 95 kg/h of Wacker® HDK SKS 300, are fed into the first chamber of a Conterna® kneading machine from IKA-Maschinenbau Janke & Kunkel GmbH & Co. KG, Staufen, composed of 12 chambers each of volume 10 liters. The composition, compacted from chamber 2 onward, is kneaded in chambers 2 to 8, with cooling, at rotation rates of from 50 to 70 rpm. The temperature rises to about 95° C. In each of chambers 9, 10, and 11, there is a feed of polydimethylsiloxane having vinyl end groups and viscosity of 20,000 mPa·s. The throughputs here are:
Chamber 9: 15 kg/h
Chamber 10: 16 kg/h
Chamber 11: 17 kg/h.

The rotation rates of the kneading units in chambers 9-11 are about 200 rpm. Chamber 12 has been provided with pump vanes, which convey the product into a devolatilization vessel. Residence time of the base composition in the kneading machine is about 28 min. The devolatilization vessel is flushed with about 5 m$^3$/h of N$_2$ at a subatmospheric pressure of about 200 mbar, in order to entrain small amounts of volatile siloxanes into an exhaust-gas-purification system. The base composition is discharged from the devolatilization container into a storage container by way means a pump, by way of a strainer unit. The amount of base composition 1 produced is 258 kg/h. Base composition 1 is transparent, with no inhomogeneity or crusting.

Comparative Example C2

Continuous Production of a Base Composition 2 for Addition-crosslinking Liquid Silicone Rubbers 180 kg/h of polydimethylsiloxane having vinyl end groups, with a viscosity of 20,000 mPa·s, and also 130 kg/h of Wacker® HDK SKS 300, are fed into the first chamber of a Conterna® kneading machine from IKA-Maschinenbau Janke & Kunkel GmbH & Co. KG, Staufen, composed of 12 chambers each of volume 10 liters. The composition, compacted from chamber 2 onward, is kneaded in chambers 2 to 8, with cooling, at rotation rates of from 50 to 70 rpm. The temperature rises to about 90° C. In each of chambers 9, 10, and 11, there is a feed of polydimethylsiloxane having vinyl end groups and viscosity of 20,000 mPa·s. The throughputs here are:
Chamber 9: 20 kg/h
Chamber 10: 22 kg/h
Chamber 11: 24 kg/h.
The rotation rates of the kneading units in chambers 9-11 are about 200 rpm. Chamber 12 has been provided with pump vanes, which convey the product into a devolatilization vessel. The devolatilization vessel is flushed with about 5 m$^3$/h of N$_2$ at a subatmospheric pressure of about 200 mbar, in order to entrain small amounts of volatile siloxanes into an exhaust-gas-purification system. The base composition is discharged from the devolatilization container into a storage container by means of a pump, by way of a strainer unit. The amount of base composition 2 produced is 376 kg/h.

Base composition 2 is transparent, but with some slight inhomogeneity (haze), but no crusting.

Example 3

Continuous Production of Base Composition 3 for Addition-Crosslinking Liquid Silicone Rubbers 180 kg/h of polydimethylsiloxane having vinyl end groups, with a viscosity of 20,000 mPa·s, and also 130 kg/h of Wacker® HDK SKS 300, are fed into the first chamber of a Conterna® kneading machine from IKA-Maschinenbau Janke & Kunkel GmbH & Co. KG, Staufen, composed of 12 chambers each of volume 10 liters. The composition, compacted from chamber 2 onward, is kneaded in chambers 2 to 8, with cooling, at rotation rates of from 50 to 70 rpm. The temperature rises to about 90° C. In each of chambers 9, 10, and 11, there is a feed of polydimethylsiloxane having vinyl end groups and viscosity 20,000 mPa·s. The throughputs here are:
Chamber 9: 20 kg/h
Chamber 10: 22 kg/h
Chamber 11: 24 kg/h.
The rotation rates of the kneading units in chambers 9-11 are about 200 rpm. Chamber 12 has pump vanes, which provide conveying into the downstream mixing apparatus by way of a pipe system.

The mixing apparatus corresponds to the second stage of the process of the invention and its structure is analogous to the diagram of the mixing apparatus (8) of FIG. 1. The full level of base composition in the mixing apparatus (8) during continuous operation is about 60%. The volume of the mixing apparatus (8) is 1.00 m$^3$. The residence time of the composition in the kneading machine is about 19 min. The residence time of the composition in the mixing apparatus (8) is about 96 min. The mixing apparatus (8) has been equipped with a plurality of crossbar mixing units (10) and with a plurality of scrapers (19). The scrapers (19) serve for scraping to remove the composition adhering to the inner wall of the mixing apparatus (8). The rotation rates of the units are 10 rpm. The composition is heated to a temperature of about 150° C. by a heating jacket, mounted on the outer wall of the mixing apparatus (8). To remove small amounts of volatile siloxanes, the mixing apparatus (8) is flushed with about 1 m$^3$/h of N$_2$ in a subatmospheric pressure of about 70 mbar. The base composition is then discharged from the mixing apparatus (8) into a storage container by means of a pump (17) by way of a strainer unit.

The amount of base composition 3 produced is 376 kg/h. Base composition 3 is transparent, with no inhomogeneity or crusting. The viscosity of the base compositions produced in examples 1-3 is in the range from 1000 to 1500 Pa·s, immediately after production.

Stability Testing:

To check the stability of the liquid silicone rubbers produced from the base compositions of the invention and not of the invention, two components A and B were produced in the following manner using a method based on the prior art:

Production of A Component:

345.8 g of base composition were mixed with 3.5 g of a dimethylvinylsiloxy-terminated polydimethylsiloxane having methylvinylsiloxy groups and 2.5 mmol/g vinyl content and viscosity of 350 mm$^2$/s, and 0.7 g of a catalyst solution which has 1% by weight Pt content and which comprises a divinyltetramethyldisiloxane platinum complex in silicone polymer.

Production of B Component:

90 g of base composition were mixed with 0.1 g of 1-ethynyl-1-cyclohexanol, 5.5 g of a vinyldimethylsiloxy-terminated polydimethylsiloxane with viscosity 20,000 mPa·s, 3.3 g of a copolymer composed of dimethylsiloxy units and methylhydrosiloxy units, in a molar ratio of 2:1, trimethylsiloxy-terminated, with viscosity 100 mPa·s and having 0.5% SiH content.

To check stability with respect to viscosity increase after storage, the viscosity of the B components was monitored at an elevated temperature and for a period of 28 days. This is a procedure known to the person skilled in the art for evaluating the storage stability of liquid silicone rubbers.

Table 1 lists the viscosity [mPa·s] of the B components of the liquid silicone rubbers containing the base compositions from examples 1 to 3, measured in a rheometer, using a shear rate D=0.89$^{-1}$. The viscosity was measured not only immediately after production of the mixture (initial viscosity) but also after two weeks and four weeks of storage of the respective component, at a temperature of 50° C.

TABLE 1

| Viscosity in [mPa · s] | LSR from base composition 1 | LSR from base composition 2 | LSR from base composition 3* |
|---|---|---|---|
| Initial | 915,000 | 934,000 | 922,000 |
| after 2 weeks | 1,070,000 | 1,690,000 | 980,000 |
| after 4 weeks | 1,281,000 | 2,212,000 | 1,107,000 |

*of the invention

A viscosity increase on storage is in principle undesired and is at its smallest for the B component of the liquid silicone rubber comprising base composition 3 which derives from Example 3 and which was produced by the process of the invention, even though throughput was markedly higher when comparison is made with the B component comprising the base composition 1 derived from Comparative Example C1. This simply means that the base compositions produced by the process of the invention have markedly better storage stability in liquid silicone rubber formulations. In contrast, the B component of the liquid silicone rubber comprising base composition 2, which derives from Comparative Example C2 and which was produced with throughput identical with that for base composition 3 derived from Example 3, exhibits a very large viscosity increase. This leads to considerable problems in the injection-molding process, even after a relatively short storage time. The result demonstrates impressively that the base composition produced by the process of the invention can be produced at throughputs markedly above 300 kg/h, and that no problems are then expected when a liquid silicone rubber based on the base composition produced in the invention is injection molded.

For measurement of mechanical properties, components A and B of the addition-crosslinking liquid silicone rubber formulations (LSR) were homogeneously mixed with one another in a ratio of 1:1, using a blade stirrer, and then converted to the elastic state (vulcanized) in a heated press at a temperature of 165° C. over a period of 5 minutes.

The values given in table 2 for the mechanical properties of vulcanizates of addition-crosslinking liquid silicone elastomers produced from base composition 3 of the invention and from base composition 1 (not of the invention) feature, in both cases, a very well balanced mechanical property profile.

TABLE 2

| Base composition in LSR | Hardness (Shore A) | Elongation at break [%] | Ultimate tensile strength [N/mm$^2$] | Tear propagation resistance [N/mm] | Compression set** [%] |
|---|---|---|---|---|---|
| 1 | 41 | 580 | 9.5 | 30 | 13 |
| 3* | 38 | 600 | 9.8 | 28 | 10 |

*of the invention
**measured over a period of 22 h at 175° C. by a method based on ISO 815

Stability with respect to SiH degradation was checked by using $^1$H NMR to assess SiH content during the above-mentioned storage of the various B components over the stated period, i.e. measurements were made at defined intervals.

The lowest SiH degradation was found in the SiH content of the B component produced from base composition 3 of the invention.

Stability with respect to additive degradation was checked on an example of a self-adhesive liquid silicone rubber formulation comprising an adhesion-promoter system in the B component.

Production of the B component of a self-adhesive liquid silicone rubber:

90 g of base composition were mixed with 0.1 g of 1-ethynyl-1-cyclohexanol, 5 g of a vinyldimethylsiloxy-terminated polydimethylsiloxane with viscosity 20,000 mPa·s (25° C.), 2.4 g of a copolymer composed of methylhydrosiloxy units and dimethylsiloxy units in a molar ratio of 1:2 and trimethylsiloxy end groups with viscosity 100 mPa·s, and SiH content 0.5%, 1.2 g of pentamethylcyclopentasiloxane, and 1.5 g of 3-glycidoxypropyltrimethoxysilane.

B components were produced with base compositions 1 to 3, and viscosity increase was monitored after storage at a temperature of 25° C. over a period of 3 months. Adhesion promoter content was also quantified over a period of 3 months, by way of infra red spectroscopy.

With the exception of the B component comprising base composition 3 of the invention, the viscosity increase found for the B components after 3 months was above 3,000,000 mPa·s. This in itself would lead to considerable feed problems or processing problems during injection molding.

When the adhesion-promoter content of the B components was measured by way of IR spectroscopy, marked degradation of the adhesion promoter was found for the B components comprising base compositions 1 and 2. In contrast, only slight degradation of adhesion promoter is found for the B component comprising base composition 3 of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the production of base compositions with viscosity from 500,000 to 12,000,000 mPa·s, measured at 25° C. and at a shear rate of 1 s$^{-1}$, which comprises, in a first stage of the process, homogeneously mixing and kneading the following with one another A) at least one diorganopolysiloxane comprising units of the formula (I)

$$R^1_a R^2_b SiO_{(4-a-b)/2} \quad (I)$$

where

R$^1$ is a hydroxy moiety or a monovalent, optionally halogen-substituted C$_{1-20}$ hydrocarbon moiety which optionally contains O atoms, N atoms, S atoms, or P atoms, and which is free from aliphatically unsaturated groups, R$^2$ is a monovalent, aliphatically unsaturated, optionally halogen-substituted C$_{2-10}$ hydrocarbon moiety which optionally contains O atoms, N atoms, S atoms, or P atoms, b is on average from 0.0001 to 2, with the proviso that 1.5<(a+b)≦3.0 and that there is an average of at least two aliphatically unsaturated moieties R$^2$ per molecule, and that the viscosity of the diorganopolysiloxanes, determined at 25° C., is from 1 to 40,000,000 mPa·s, and B) at least one prehydrophobized oxidic reinforcing filler having at least 0.5% by weight carbon content gained via a hydrophobizing process, in a kneading cascade with at least two kneading chambers arranged alongside one another in series, each of these comprising, parallel to the axis, two kneading units driven so as to corotate or counterrotate, connection to other kneading chamber(s) being by passage apertures running perpendicularly with respect to the axes of the kneading units, where at least the first kneading chamber has a supply aperture and the last kneading chamber has a discharge aperture, and subjecting the resultant composition, in a second downstream stage of the process, to aftertreatment in a mixing apparatus, which has a supply aperture, by way of which the composition produced by way of the first stage of the process is introduced at a defined volume flow rate X to the mixing apparatus, subjected to shear force and devolatilized, wherein the composition is present in the mixing apparatus in an amount which occupies from 20 to 90% of the total volume of the mixing apparatus, thus forming a surface of the composition which is exposed to a gas atmosphere within the mixing apparatus, with constant renewal of the surface of the composition with use of rotating mixing/kneading units, and optionally scrapers, and discharging the composition from the second stage of the process by way of a discharge aperture at a volume flow rate Y.

2. The process of claim 1, wherein the average residence time of the base composition is longer in the second stage of the process than in the first stage of the process.

3. The process of claim 1, wherein the second stage of the process subjects the compositions produced in the first stage of the process to a mixing procedure in which the shear force introduced is smaller than in the first stage of the process.

4. The process of claim 2, wherein the second stage of the process subjects the compositions produced in the first stage of the process to a mixing procedure in which the shear force introduced is smaller than in the first stage of the process.

5. The process of claim 1, wherein the surface area to volume ratio of the mixing apparatuses is greater in the second stage of the process than in the first stage of the process.

6. The process of claim 1, wherein the second stage of the process subjects the compositions produced in the first stage of the process to vacuum treatment at an elevated temperature.

7. The process of claim 1, wherein the mixing apparatus of the second stage contains from 40% to 60% by volume of the composition relative to the volume of the mixing apparatus.

8. The process of claim 1, wherein X is less than Y.

9. The process of claim 1, wherein the mixing apparatus of the second stage comprises a stirred tank containing rotating blades which shear the composition.

10. The process of claim 9, wherein the stirred tank further contains scraper blades which scrape composition from walls of the stirred tank.

11. The process of claim 1, wherein the mixing apparatus of the second stage comprises a dissolver disk unit.

12. The process of claim 1, wherein at least one mixing apparatus of the second stage is selected from the group consisting of planetary gear mixing units, double-planetary gear mixing units, crossblade mixing units, helical mixing units, dissolver disk mixing units, propeller mixing units, and scraper mixing units.

13. The process of claim 1, wherein an upper surface of the composition in the mixing vessel is exposed to a vacuum or gas space in the mixing vessel, and a ratio of exposed surface to volume of the composition is from 0.1:1 to 10:1.

* * * * *